United States Patent [19]

Huddart et al.

[11] Patent Number: 5,729,603
[45] Date of Patent: Mar. 17, 1998

[54] SELF-CONFIGURING TELEPHONE INTERFACE UNIT

[75] Inventors: David Huddart, Bristol, United Kingdom; Robert M. Khamashta, Los Gatos, Calif.

[73] Assignee: Plantronics, Inc., Santa Cruz, Calif.

[21] Appl. No.: 719,815

[22] Filed: Sep. 30, 1996

[51] Int. Cl.⁶ .................................................. H04M 1/00
[52] U.S. Cl. .................... 379/387; 379/395; 379/430; 379/6
[58] Field of Search ............................ 379/58, 387, 441, 379/399, 442, 430, 395, 6, 433, 436, 438

[56] References Cited

U.S. PATENT DOCUMENTS

| | | | |
|---|---|---|---|
| 4,431,871 | 2/1984 | Gupta | 379/418 |
| 4,697,282 | 9/1987 | Winter et al. | 379/67 |
| 4,788,708 | 11/1988 | Hendrix | 379/6 |
| 4,876,712 | 10/1989 | Brint et al. | 379/387 |
| 4,879,746 | 11/1989 | Young et al. | 379/399 |
| 4,918,726 | 4/1990 | Snyder | 379/395 |
| 4,928,306 | 5/1990 | Biwas et al. | 379/201 |
| 4,930,156 | 5/1990 | Norris | 379/388 |
| 4,951,002 | 8/1990 | Hanon | 330/151 |
| 4,975,949 | 12/1990 | Wimsatt et al. | 379/387 |
| 5,058,155 | 10/1991 | Larsen | 379/442 |
| 5,185,789 | 2/1993 | Hanon et al. | 379/395 |
| 5,229,721 | 7/1993 | Stade | 330/265 |
| 5,235,637 | 8/1993 | Kraz et al. | 379/387 |
| 5,353,347 | 10/1994 | Irissou et al. | 379/395 |
| 5,396,551 | 3/1995 | Lucey | 379/395 |
| 5,544,243 | 8/1996 | Papadopoulos | 379/413 |
| 5,555,300 | 9/1996 | Gutzmer | 379/395 |

OTHER PUBLICATIONS

"Hello Direct", Prospectus, pp. 1, 23–24, Apr. 7, 1995.

*Primary Examiner*—Harry S. Hong
*Assistant Examiner*—Taunya A. McCarty
*Attorney, Agent, or Firm*—Fenwick & West LLP

[57] ABSTRACT

A telephone interface unit automatically configures itself to couple a headset to a telephone. The interface unit comprises a switch matrix, for coupling various signal lines of the telephone to various signal lines of the headset, and a control logic, for automatically setting the switch matrix. The interface unit also comprises a variable gain circuit, for adjusting the amplitude of signals transmitted by the headset. The control logic automatically adjusts the gain of the variable gain circuit such that the gain of the headset is matched to the gain of the telephone.

23 Claims, 4 Drawing Sheets

FIG. 5
(AMENDED)

FIG. 6

SELF-CONFIGURING TELEPHONE INTERFACE UNIT

BACKGROUND

1. Field of Invention

The present invention relates to apparatuses and methods for interfacing headsets to telephones, and more particularly, to apparatuses and methods that automatically configure the interface between a telephone and a headset.

2. Background of Invention

Telephones are an important means of communication. Conventional telephones usually consist of a telephone body and a corresponding handset. One drawback to such telephones, however, is that the handset prevents the user from using his hands for other tasks. For example, it is difficult to use a telephone handset while simultaneously operating a computer keyboard. Accordingly, headsets that perform the same communications function as handsets but without requiring the use of hands are now commonly used.

A headset typically requires an interface unit to correctly couple the headset to the telephone body. However, since the headset and interface unit are typically manufactured independently of the handset and telephone body and since it is desirable for the interface unit to be compatible with many different telephone bodies and handsets, the interface unit must be configured to match a specific telephone body and handset. One drawback of current interface units is that they are manually configured by the user.

The configuration normally includes two tasks. First, the receive and transmit signal lines of the telephone body must be correctly coupled to the receive and transmit signal lines of the headset. However, no standard exists as to which of the signal lines from the telephone body constitute the receive path for signals and which the transmit path. In the case of conventional interface units, the ideal user would determine the proper configuration by consulting a compatibility look-up table, which documents the proper configurations for various telephones, and then manually set the interface unit to the correct configuration. However, this table is large and constantly updated. Accordingly, it is usually held in a central location and may not be conveniently accessible by users. As a result, the user may rely instead on his subjective perception to accomplish the first task, typically manually switching the various signal lines of the telephone to the headset until the proper configuration is determined.

Assuming that the user correctly couples the telephone body to the headset, he must then correctly adjust the pain of the headset microphone. The handset microphone has a gain that is matched to the telephone body since these two devices are typically manufactured together. In order for the headset to operate optimally, the gain on the headset microphone should also be matched to the telephone body. However, since handsets and their corresponding telephone bodies vary widely in their gains and since it is unknown which telephone body will be used with any specific headset at the time the headset is manufactured, the user typically must adjust the gain on the headset microphone. Again, the ideal user will accomplish this by consulting the compatibility look-up table and then manually adjusting the headset gain to the correct level. Again, however, the less-than-ideal user may rely on his own subjective perception instead.

The two manual adjustments required to correctly configure a conventional interface unit either require access to a compatibility look-up table or rely on the subjective judgment of the user. As a result, a user may have difficulty correctly configuring the interface unit or may configure it incorrectly. This results in a poorly operating headset and general dissatisfaction with the headset product. Therefore, there is a need for a telephone interface unit which automatically configures itself to the telephone.

SUMMARY OF THE INVENTION

Generally, the present invention comprises a telephone interface unit and method for automatically coupling a headset to a telephone. The present invention automatically couples the receive and transmit signal paths from a telephone body to the corresponding signal paths for a headset, allowing the headset to communicate with the telephone body. The present invention also automatically adjusts the gain of the transmit path of the headset to match the gain of the telephone body, so that the headset transmits signals at the correct amplitude. Since this configuration is automatic, users may avoid the subjective and complicated manual adjustments which would otherwise be required and the headset is also more likely to be correctly interfaced to the telephone body.

In one embodiment, a telephone interface unit in accordance with the invention comprises a switch matrix and a control logic, which couple the receive and transmit signal paths from the telephone body to the corresponding signal paths for the headset. The switch matrix may be set to one of many switch configurations, each configuration resulting in a different coupling of signal lines from the handset port of the telephone body to signal lines from the headset. The handset port signal lines include a handset port receive path. Likewise, the headset signal lines include a headset receive path. The control logic automatically sets the switch matrix to a preferred switch configuration which couples the handset port receive path to the headset receive path.

In another aspect, the telephone interface of the present invention additionally comprises a variable gain circuit which, in conjunction with the control logic, automatically adjusts the gain of the interface unit. The variable gain circuit modifies the amplitude of signals transmitted from the headset. The control logic automatically adjusts the gain of the variable gain circuit until the gain of the headset is matched to the gain of the handset. This matches the headset gain to the telephone body since the handset gain is assumed to be matched to the telephone body. As a result, either the handset or headset may be used to transmit signals to the rest of the telephone.

A method in accordance with the invention includes receiving a test signal, typically a dial tone, on the handset port receive path. Output signals for possible configurations of the switch matrix are generated in response to the test signal, each output signal indicating how well the handset port receive path is coupled to the headset receive path under that corresponding configuration. The handset pore receive path, and hence the telephone body, is then correctly coupled to the headset receive path in response to the output signals.

In another aspect, the method further comprises receiving test signals transmitted from the headset transmit path and from the handset transmit path. The two test signals are alternately coupled to the handset port transmit path, and hence the telephone body, in rapid succession, producing two gain signals, one indicating the gain of the headset transmit path and the other indicating the gain of the handset transmit path. The gain of the headset transmit path is adjusted in response to the two gain signals to match the gain of the handset transmit path.

DETAILED DESCRIPTION OF THE INVENTION

Figure 1:
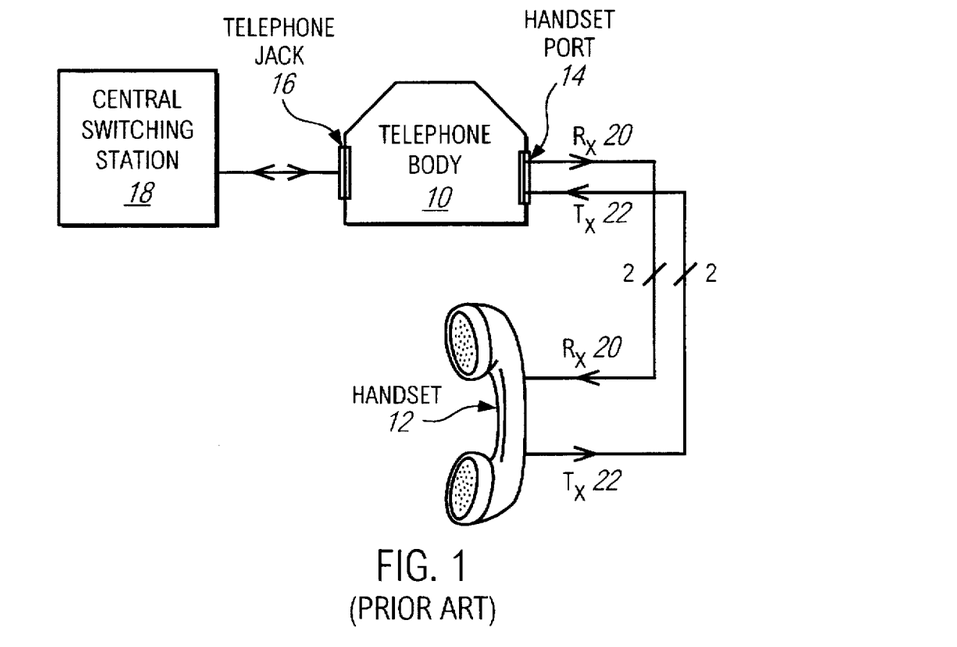
FIG. 1 is a block diagram of a system including a telephone suitable for use with the present invention.

FIG. 1 is a block diagram of a telephone suitable for use with the present invention. The telephone consists of a telephone body 10 and a handset 12. The telephone body 10 includes a handset port 14, for communicating with the handset 12, and a telephone jack 16, for communicating with some central switching station 18. The telephone body 10 communicates to the handset 12 via a receive path 20 and a transmit path 22, the receive path 20 being the communications path by which signals are received by the handset 12 from the telephone body 10. Similarly, the transmit path 22 is the path by which signals are transmitted from the handset 12 to the telephone body 10. Throughout this description, the term "receive path" will be used to refer to communications paths in which the normal flow of signals is away from the central switching station 18 and toward a transducer, such as the handset 12. Similarly, "transmit path" will be used to refer to communications paths in which signals normally flow in the opposite direction. The receive and transmit paths 20 and 22 typically consist of two signal lines.

Those of ordinary skill in the art will recognize that the handset 12 and corresponding telephone body 10 are representative devices only and the present invention is not limited to operation with telephones consisting of a handheld transducer and a corresponding telephone body. For example, the handset 12 and telephone body 10 may be replaced by a speaker phone which rests on a tabletop and its corresponding telephone body, respectively. Other types of transducers and telephone bodies will be apparent to those of ordinary skill in the art.

Figure 2:
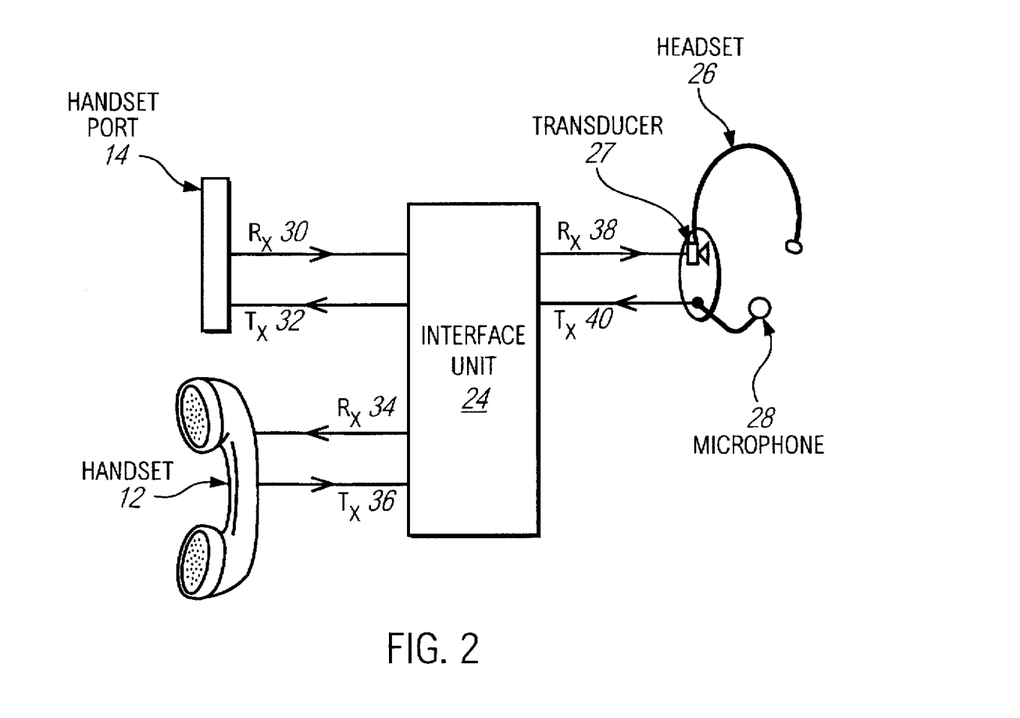
FIG. 2 is a block diagram of a system utilizing the present invention with the telephone of FIG. 1.

FIG. 2 depicts a portion of the telephone of FIG. 1 as used with the present invention. In the figure, the handset port 14 is no longer directly coupled to the handset 12. Instead, the handset port 14 and handset 12 are coupled to an interface unit 24, which is also coupled to a headset 26. Headset 26 includes a transducer 27 for producing audible signals to the user and a microphone 28 for receiving a user's voice. One of the purposes of the interface unit 24 is to allow the headset 26 to communicate with the handset port 14, and thereby enable the user to use the headset 26 with the telephone 10.

The interface unit 24 communicates with each of the other devices in FIG. 2 by two communications paths, a receive path and a transmit path. Thus, the handset port 14 is connected to the interface unit 24 by a handset port receive path 30 and a handset port transmit path 32. Similarly, the handset 12 is connected to the interface unit 24 by a handset receive path 34 and a handset transmit path 36; and the headset 26 is connected to the interface unit by a headset receive path 38 and a handset transmit path 40. The receive path 38 is further coupled to the transducer 27, and the transmit path 40 to the microphone 28.

The receive and transmit paths are defined as previously described. Hence, for example, the handset port receive path 30 must be coupled to the headset receive path 38 in order for the headset 26 to properly receive signals. Likewise, the headset transmit path 40 must be coupled to the handset port transmit path 32 in order to properly transmit signals from the headset 26. A similar situation exists between the handset port 14 and the handset 12.

Figure 3:
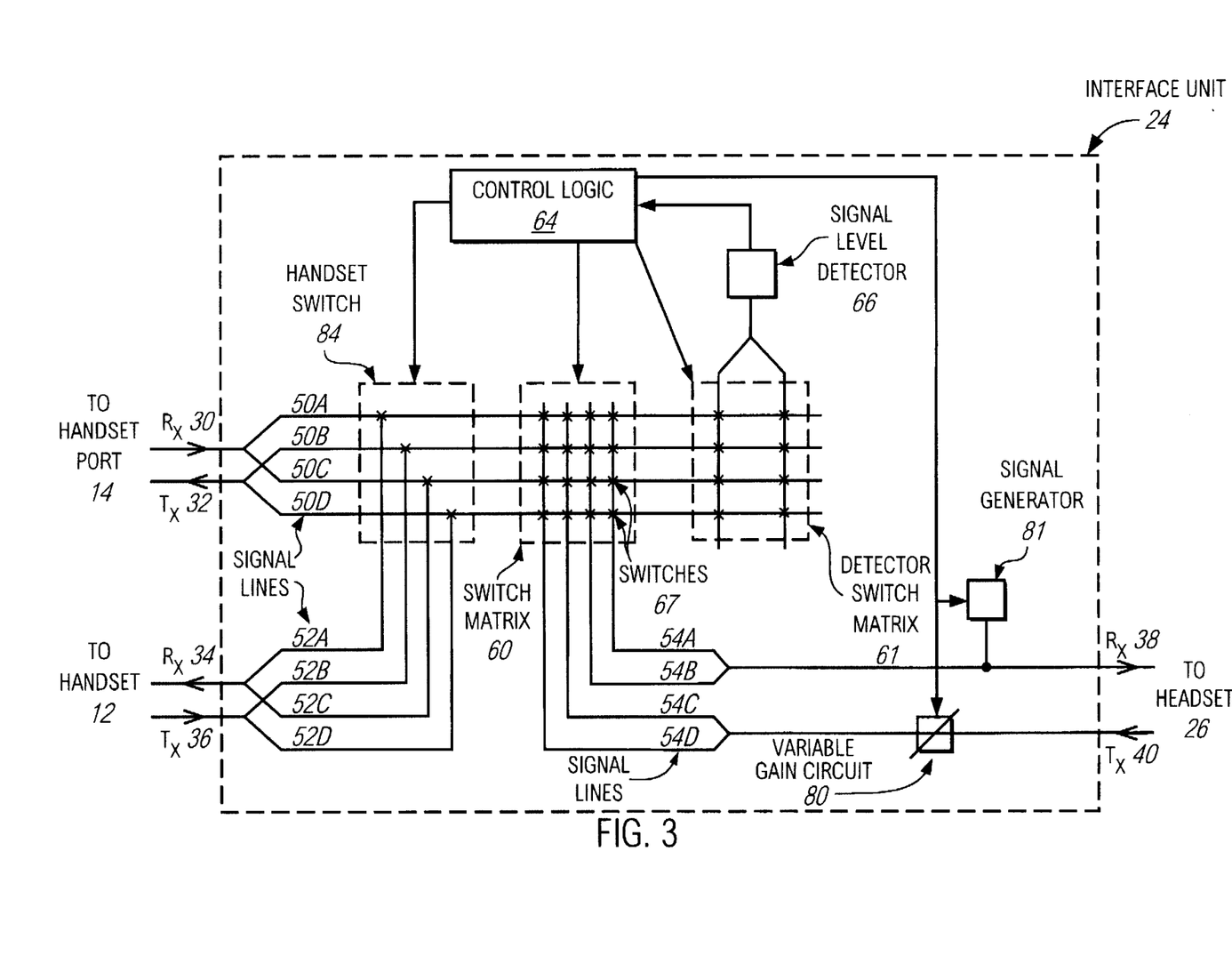
FIG. 3 is a block diagram of the preferred embodiment of the telephone interface unit in FIG. 2.

FIG. 3 is a block diagram of the interface unit 24, which will be used in describing how the interface unit 24 automatically configures itself to couple the headset 26 to the handset port 14 of the telephone body 10.

One of the configuration tasks of the interface unit 24 is to automatically couple the handset port receive path 30 to the headset receive path 38 and also the handset port transmit path 32 to the headset transmit path 40. More specifically, in the preferred embodiment, each communications path 30, 32, 34, 36, 38, and 40 consists of two separate signal lines, typically on wire conductors, although other transmission media may be used, such as infrared, magnetic induction, radio, or the like. FIG. 3 depicts this by pictorially splitting each of the communications paths 30, 32, 34, 36, 38, and 40 into two of the signal lines from among 50A to 54D. For example, the handset port receive path 30 is split into signal lines 50A and 50C. Likewise the handset port transmit path 32 is split into the signal lines 50B and 50D. Each receive path/transmit path pair consists of four signal lines. In FIG. 3, coupling the handset port receive path 30 to the headset receive path 38 then consists of coupling the signal lines 50A and 50C to the signal lines 54A and 54B.

However, the task is not so straightforward. FIG. 3 shows the handset port receive path 30 as corresponding to signal lines 50A and 50C. In general, however, there is no standard as to which of the four signal lines 50A to 50D correspond to the handset port receive path 30. Generally speaking, for any given telephone, the receive path 30 could correspond to any two of the four signal lines 50A to 50D, with the transmit path 32 accounting for the remaining two signal lines. Accordingly, it becomes necessary to correctly couple the four signal lines 50A to 50D to the four signal lines 54A to 54D, yielding twenty-four possible combinations. However, the polarity of the signal lines is not important, reducing the twenty-four possibilities to the six possible configurations shown in Table 1 below.

TABLE 1

| Configuration number | Signal lines | | | |
|---|---|---|---|---|
| | 50A | 50B | 50C | 50D |
| 1 | Rx 30 | Rx 30 | Tx 32 | Tx 32 |
| 2 | Rx 30 | Tx 32 | Rx 30 | Tx 32 |
| 3 | Tx 32 | Rx 30 | Rx 30 | Tx 32 |
| 4 | Rx 30 | Tx 32 | Tx 32 | Rx 30 |
| 5 | Tx 32 | Rx 30 | Tx 32 | Rx 30 |
| 6 | Tx 32 | Tx 32 | Rx 30 | Rx 30 |

The mapping shown in FIG. 3 corresponds to configuration number 2 of Table 1 since signal lines 50A and 50C correspond to receive path 30, as indicated by the "Rx 30" under the headings "50A" and "50C" in the row for configuration number 2. Configuration number 2 is chosen for illustrative purposes only. In general, any of the six configurations may be the correct one.

Thus, the interface unit 24 determines which of the six configurations of Table 1 is the correct one and then makes the appropriate connections. In the preferred embodiment of FIG. 3, the interface unit 24 automatically determines which two of the four signals 50A to 50D correspond to the receive path 30 and then connects these two signal lines (50A and 50C for the example in FIG. 3) to signal lines 54A and 54B, which correspond to headset receive path 38. A similar determination is not required on the headset side, since it is generally known which signal lines 54A to 54D correspond to headset receive and transmit paths 38 and 40. Typically, for example, the same manufacturer may produce both the interface unit 24 and the headset 26, although the present invention allows the interface unit 24 to be used with any plug compatible headset or telephone.

Continuing the example of FIG. 3, note that signal lines 50A and 50C may be connected to signal lines 54A and 54B in either of the two possible combinations due to the polarization insensitivity. That is, signal line 50A could be connected to signal line 54A and 50C to 54B; or signal line 50A could be connected to 54B and 50C to 54A. Both combinations will result in the correct coupling of handset port receive path 30 to headset receive path 38. In contrast, if the lines were polarization sensitive, then the two above combinations would represent two distinct configurations, only one of which would be correct.

Conventionally, the handset port receive path 30 is manually coupled to the headset receive path 38 by the user. The present invention, however, automatically configures the handset port receive path 30 to the headset receive path 38.

In the preferred embodiment of the invention, the coupling is achieved through the use of a switch matrix 60, which can implement and switch between any of the configurations in Table 1. Each possible configuration is tested by applying a test signal, typically a dial tone, to the handset port receive path 30 and then measuring the resulting signal on the two of the four signal lines 50A to 50D which would be connected to the receive path 30 for that configuration. For example, to test configuration 1 of Table 1, the dial tone is applied to the handset port receive path 30 and the resulting signal on lines 50A and 50B is then measured. These trials determine which of the four signal lines 50A to 50D correspond to the handset port receive path 30. The switch matrix 60 is then set to the corresponding configuration, thus coupling the handset port receive path 30 to the headset receive path 38.

More specifically, the detector switch matrix 61 is used to test each of the configurations. After the dial tone is received on the handset port receive path 30, the control logic 64 sets the detector switch matrix 61 into a first of the six possible configurations, coupling two of the four signal lines 50A to 50D to the signal level detector 66. The control logic 64 then receives the output signal from the signal level detector 66, which measures the strength of the resulting signal on the two of the four lines 50A to 50D. The output signal is an indication of whether the first configuration is the correct one. For example, if the first configuration for the detector switch matrix 61 coupled the signal lines 50A and 50C to the signal level detector 66, then the signal level detector 66 would receive a strong dial tone and would send a correspondingly strong output signal to the control logic 64. On the other hand, if the first configuration coupled signal lines 50B and 50D to the signal level detector 66, then the signal level detector 66 would receive a weak signal, if any, and the output signal sent by the signal level detector 66 would be correspondingly weak. The control logic 64 repeats this procedure for all six possible combinations in Table 1. Based on the output signal received from the signal level detector 66 for each trial configuration, the control logic 64 determines which two of the four signal lines 50A to 50D correspond to the handset port receive path 30.

This process determines which of the six configurations is the preferred configuration, the preferred configuration being the one which couples the handset port receive path 30 to the headset receive path 38 and hence to the transducer 27. That is, the preferred configuration couples the handset port 14 of the telephone body 10 to the headset transducer 27, providing a dial tone to the transducer 27. Once the complete receive path is determined, the remaining two of the four signal lines 50A to 50D must represent the handset port transmit path 32 and the complete transmit path can also be determined. The preferred configuration thus also couples the headset transmit path 40 to the handset port transmit path 32, coupling the headset microphone 28 to the handset port 14 of the telephone body 10. The control logic 64 implements the correct couplings by setting the switch matrix 60 to the preferred configuration. In the example of FIG. 3, setting the switch matrix 60 to the preferred configuration will couple signal lines 50A and 50C to 54A and 54B (the receive path); and also lines 50B and 50D to 54C and 54D (the transmit path).

In the preferred embodiment, the control logic 64 determines the preferred configuration sequentially, as follows. First, the output signal from the signal level detector 66 associated with the first configuration is stored and the first configuration is identified as the current best configuration. Then, the detector switch matrix 61 is set to a second configuration. If the signal level detector 66 output signal for the second configuration is stronger than that for the first, then the second configuration replaces the first as the current best configuration. Otherwise, the first configuration remains the current best configuration. After the six configurations of Table 1 are tried, the current best configuration will be known to be the preferred configuration.

Those of ordinary skill in the art will recognize other methods for determining the preferred configuration. For example, the control logic 64 may cycle the detector switch matrix 61 through all six possible configurations, storing the output signal produced by the signal level detector 66 for each configuration, and determine which of the six configurations is the preferred configuration only after all six output signals are recorded. Alternately, the determination may be based on measures other than signal strength, such as detecting a best signal to noise ratio.

FIG. 3 depicts the switch matrix 60 as a complete 4×4 matrix of switches 67, denoted by X's in FIG. 3. Each switch 67 switchably couples one of the signal lines 50A to 50D to one of the signal lines 54A to 54D and the switches 67 are independently set by a control logic 64. This type of switch matrix 60 allows any of the four signal lines 50A to 50D to be coupled to any of the four signal lines 54A to 54D. While this functionality is useful for explaining the purpose of the switch matrix 60, it is not required.

Figure 4A:
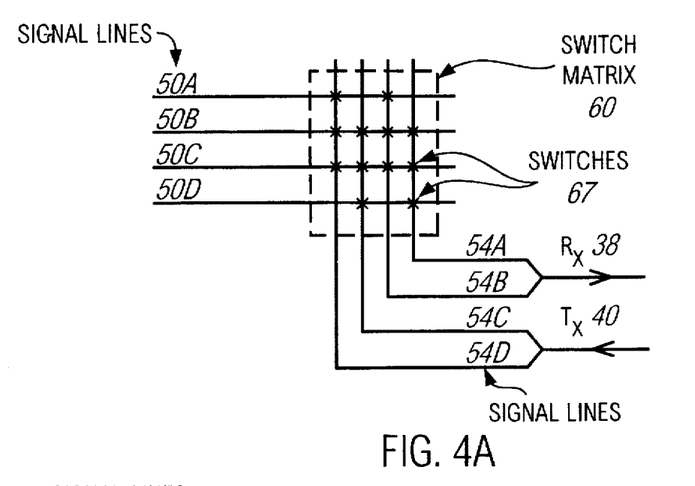
FIGS. 4A and 4B are schematic diagrams of various embodiments of the switch matrix in FIG. 3.
Figure 4B:
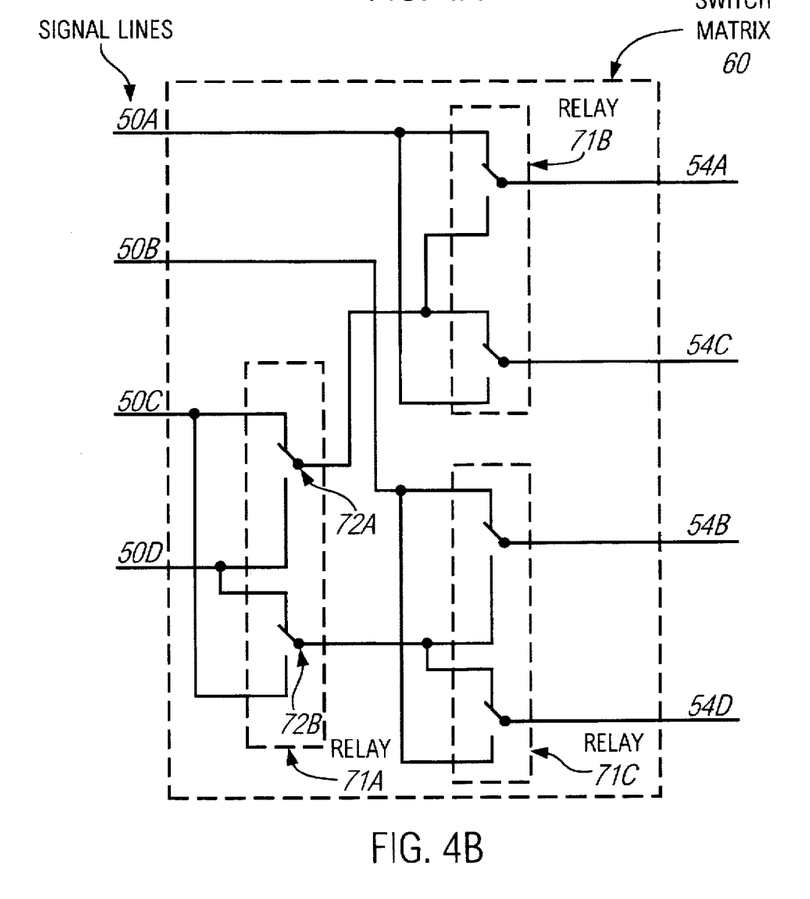

FIGS. 4A and 4B depict alternate embodiments of the switch matrix 60. FIG. 4A takes advantage of the facts that the switch matrix 60 need only implement the six configurations in Table 1 and that the couplings are polarization insensitive, resulting in a switch matrix 60 with four less switches 67 than the embodiment in FIG. 3.

FIG. 4B depicts an embodiment of the switch matrix 60 based on relays. More specifically, the switch matrix 60 consists of three double-throw, double-pole relays 71A, 71B and 71C, which are arranged in a cascading architecture. For example, the relay 71A contains the two poles 72A and 72B. Each of these poles may make either of two contacts. When the relay 71A is in the position shown in FIG. 4B, the pole 72A is connected to signal line 50C and pole 72B is connected to signal line 50D. In the other relay position, pole 72A is connected to signal line 50D and pole 72B to signal line 50C. The six configurations of Table 1 may then be implemented according to Table 2, where a each relay's "ON" position is defined as the position shown in FIG. 4B.

TABLE 2

| Configuration number | Relay | | |
|---|---|---|---|
| | 71A | 71B | 71C |
| 1 | ON | ON | ON |
| 2 | OFF | ON | OFF |
| 3 | ON | OFF | ON |
| 4 | ON | ON | OFF |
| 5 | OFF | OFF | ON |
| 6 | ON | OFF | OFF |

Other embodiments of the switch matrix will be obvious to those skilled in the art. Similar alternate embodiments and remarks apply to the detector switch matrix 61.

Figure 5:
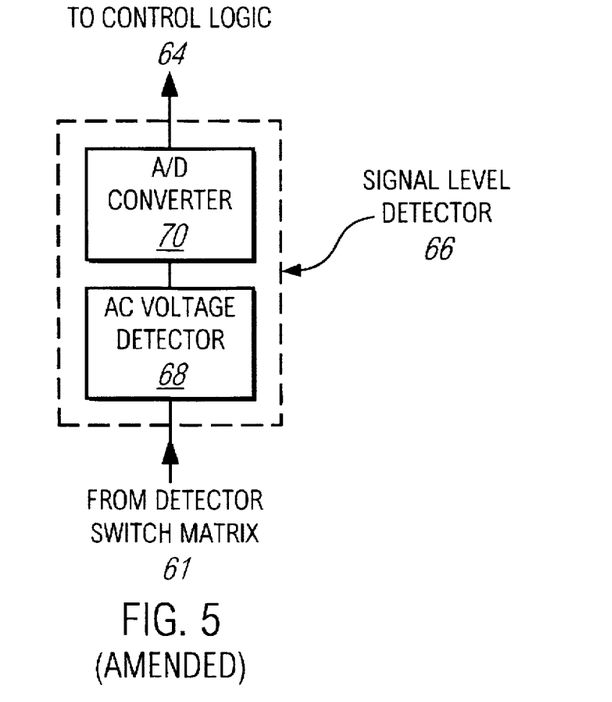
FIG. 5 is a block diagram of the signal level detector in FIG. 3.

FIG. 5 depicts the signal level detector 66 of the preferred embodiment. The signal level detector 66 measures the voltage between two of the four signal lines 50A to 50D. More specifically, the AC voltage detector 68 is used to determine the actual level of signals between the two signal lines. The A/D converter 70 then converts the output of the AC voltage detector 68 to digital format, which is then sent to the control logic 64.

Figure 6:
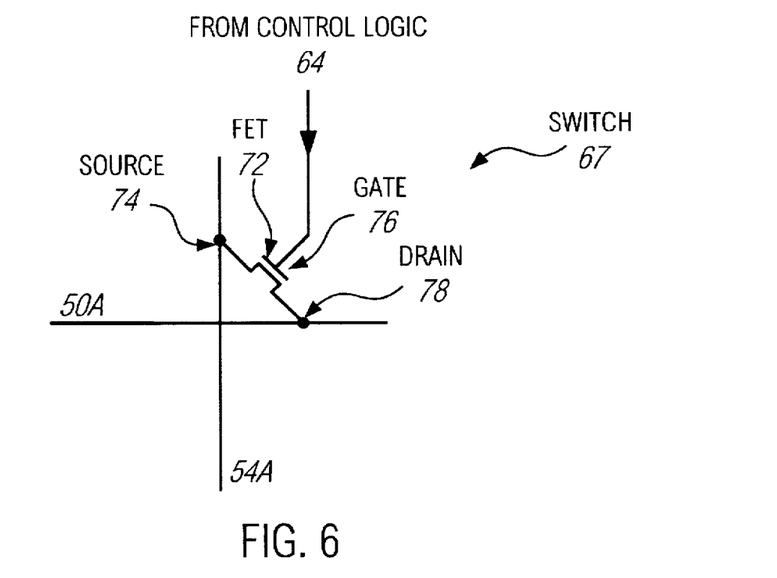
FIG. 6 is a schematic diagram of one of the switches in FIG. 3.

FIG. 6 depicts a switch 67 of the preferred embodiment. The switches 67 are implemented as FET switches. The FET 72 consists of a source 74, a gate 76 and a drain 78. In the example of FIG. 6, the source 74 is coupled to signal line 54A and the drain 78 is coupled to signal line 50A. The gate 76 is then driven by an FET gate driver which is part of the control logic 64. When the FET 72 is turned on by the gate 76, the signal line 50A is coupled to signal line 54A. When the FET 72 is turned off, the two signal lines 50A and 54A are not coupled. It will be recognized that the designation of source 74 and drain 78 in FIG. 6 is for illustrative purposes only and may be reversed without affecting the operation of the switch 67. It will also be recognized that the signal lines 50A and 54A were chosen for illustrative purposes only and that any or all of the switches 67 may be implemented as FET switches. In addition, those of ordinary skill will recognize that the switches 67 may be implemented by other technologies, such as relays or bipolar transistors.

Referring once again to FIG. 3, once the interface unit 24 has coupled the handset port receive and transmit paths 30 and 32 to the headset receive and transmit paths 38 and 40, the interface unit 24 also automatically adjusts the gain of the headset transmit path 40 so that signals transmitted by the headset microphone 28 will not be too loud or too soft for the telephone body 10. Generally speaking, the gain of the handset transmit path 36 will already be matched to the gain of the handset port transmit path 32 since the telephone body 10 and handset 12 typically are manufactured together. Accordingly, the interface unit 24 matches the gain of the headset transmit path 40 to the gain of the handset transmit path 36, thereby matching the gain of the headset transmit path 40 to that of the handset port transmit path 32.

In the preferred embodiment, the control logic 64 adjusts the gain of the headset transmit path 40 via a variable gain circuit 80 in the transmit path 40. Generally speaking, an audio test signal is received by both the handset transmit path 36 and the headset transmit path 40. In the preferred embodiment, the user simultaneously speaks into the handset 12 and headset 26. The control logic 64 then rapidly switches between the handset and headset transmit paths 36 and 40, comparing the resulting signals on the two paths. For convenience, the resulting signals will be referred to as gain signals since they are measures of the gain of the handset or headset transmit paths 36 or 40, respectively. The control logic 64 then adjusts the gain of the variable gain circuit 80 until the two gain signals are comparable in strength.

More specifically, when the interface unit 24 is ready to adjust the gain of the headset transmit path 40, the control logic 64 instructs the signal generator 81 to produce an audio signal on the headset receive path 38, such as a tone of short duration. The user hears this signal through the headset 26 and begins speaking into the handset 12 and headset 26 simultaneously, thus generating the audio test signals.

Once the audio test signal is generated, the interface unit 24 alternately couples the handset transmit path 36 and the headset transmit path 40 to the handset port transmit path 32, switching between the two transmit paths 36 and 40 in quick succession. In the preferred embodiment, the switching occurs in the order of several milliseconds. The detector switch matrix 61 is set to couple the signal level detector 66 to the handset port transmit path 32 so that the signal level detector 66 alternately detects the gain signal associated with either transmission path 36 or 40. The control logic 64 then adjusts the variable gain circuit 80 until the gain of the headset transmission path 40 is matched to the gain of the handset transmit path 36.

The rapid switching is accomplished through use of the switch matrix 60 and handset switch 84. To couple the handset transmit path 36 to the handset port transmit path 32, the control logic 64 closes the switches in the handset switch 84 and opens the switches in the switch matrix 60. Similarly, to couple the headset transmit path 40 to the handset port transmit path 32, the control logic 64 closes the appropriate switches in the switch matrix 60 and opens the switches in the handset switch 84. The switches in the handset switch 84 are shown as X's in FIG. 3 and are FET switches of the type shown in FIG. 6 in the preferred embodiment. Due to the rapid nature of the switching, care must be taken to deglitch switching transients, for example, through the use of three stage switching, a settling period, or sample and hold logic.

In the preferred embodiment, the gain of the variable gain circuit 80 is first set at a minimum level and then increased by about 1 dB increments until the gain of transmit path 40 is equal to or greater than that of transmit path 36. This occurs when the gain signals corresponding to the handset transmission path 36 and the headset transmission path 40 are substantially equal. Those of ordinary skill in the art will recognize other methods for determining the correct gain for the variable gain circuit 80. For example, the correct gain may be determined using a bisection or successive approximation routine. In another embodiment, the gain adjustment procedure may be repeated several times, with the average value taken as the correct gain. In yet another embodiment, failure of the adjustment procedure to converge on a gain value may be signaled to the user by the signal generator 81.

Those of ordinary skill in the art will also recognize various embodiments for the control logic 64. For example, the control logic 64 may be implemented completely in hardware, using ASIC, PAL, PLA, or other technologies. Alternately, the control logic 64 may consist of a general purpose microprocessor or controller coupled with a ROM including microcoded instructions for controlling the microprocessor in accordance with the present invention. In addition, the control logic 64 may be hardwired to the rest of the interface unit 24 and communicate through dedicated conductors. Alternately, communications may occur over a common bus. Other embodiments, including implementing the entire interface unit 24 as a single chip, will be apparent to those of ordinary skill in the art.

Those of ordinary skill in the art will also recognize that the interface unit 24 may also provide other functions. For example, the user may switch between using the handset 12 and the headset 26 by directing the control logic 64 to appropriately switch the handset switch 84 and switch matrix 60. As another example, the user may mute his transmitted signal by directing the control logic 64 to set the variable gain circuit 80 to its lowest level.

Those of ordinary skill in the art will also recognize that the block diagram in FIG. 3 has been simplified for clarity. Elements which are not necessary to explain the self-configuring operation of the interface unit 24 are not shown. For example, the headset receive path 38 may contain elements such as a preamplifier and a variable gain block. The preamplifier may be used to condition received signals, including removing any DC bias, providing high and low band pass filtering, and performing impedance matching. The variable gain allows the user to adjust the volume of the headset 26. It may also be used by the control logic 64, for example, to mute the headset 26 during the self-configuring operation. Similarly, the headset transmit path 40 may also contain elements such as a preamplifier, audio conditioning circuits, and a driver amplifier. The preamplifier typically provides a DC bias to the headset 26 and conditions and/or amplifies the raw signal produced by the headset 26. The audio conditioning circuits may provide further signal conditioning functions such as level expansion, compression, and soft mute. The drive amplifier typically drives the handset port 14 and is the counterpart to the preamplifier in the headset receive path 38, providing impedance matching, DC isolation, and a floating signal with respect to 0 volts.

In FIG. 3, each of the communications paths 30, 32, 34, 36, 38, and 40 enters the interface unit 24 depicted as a single line. The splitting of each of these lines into two lines, one for each signal line 50A to 54D is not meant to imply any physical significance and is used primarily to avoid cluttering the figure. That is, in some instances, it is clearer to depict receive and transmit paths; while in other instances, it is clearer to depict the individual signal lines which make up these paths.

I claim:

1. A self-configuring telephone interface unit, comprising:
a switch matrix, settable to any of a plurality of switch configurations, each switch configuration coupling a plurality of signal lines form a handset port of a telephone to a plurality of signal lines from a headset, the plurality of signal lines from the handset port including a handset port receive path, the plurality of signal lines from the handset including a headset receive path; and a control logic, coupled to the switch matrix, that automatically determines which of the plurality of signal lines from the handset port comprise the handset port receive path, determines a preferred switch configuration from among the plurality of switch configurations based on which of the plurality of signal lines from the handset port comprise the handset port receive path, and sets the switch matrix to the preferred switch configuration, the preferred switch configuration coupling the handset port receive path to the headset receive path.

2. The interface unit of claim 1 wherein:
the switch matrix comprises a plurality of switches, each of the plurality of switches coupling one handset port signal line with one headset signal line;
each switch configuration in the plurality of switch configurations comprises a predetermined setting for each of the plurality of switches; and,
the control logic sets the switch matrix to a switch configuration by setting the plurality of switches to the predetermined setting for the switch configuration.

3. The interface unit of claim 2 wherein:
each of the plurality of switches comprises an FET switch; and,
the control logic comprises an FET gate driver that sets the FET switches.

4. The interface unit of claim 1 wherein:
the switch matrix comprises a plurality of relays, the plurality of relays coupling the plurality of handset port signal lines to the plurality of headset signal lines;
each switch configuration in the plurality of switch configurations comprises a predetermined setting for each of the plurality of relays; and,
the control logic sets the switch matrix to a switch configuration by setting the plurality of relays to the predetermined setting for the switch configuration.

5. The interface unit of claim 1 wherein:
the switch matrix is based on a cascading architecture.

6. The interface unit of claim 1 further comprising:
a signal level detector that generates an output signal, the output signal indicating a level of an input signal to the signal level detector; a detector switch matrix, settable to any of a plurality of detector switch configurations, each detector switch configuration coupling the signal level detector input to signal lines from among the plurality of signal lines from the handset port; the control logic further for setting the detector switch matrix to a first detector switch configuration from among the plurality of detector switch configurations; for receiving a first output signal from the signal level detector, the first output signal generated in response to a test signal received by the handset port receive path; and for determining, based on the first output signal from the signal level detector, whether the signal lines coupled by the first detector switch configuration comprise the handset port receive path.

7. The interface unit of claim 6 wherein:
the test signal comprises a dial tone.

8. The interface unit of claim 6 wherein the signal level detector comprises:
an AC voltage detector which receives the input signal to the signal level detector; and,
an A/D converter coupled to the AC voltage detector, the A/D converter generating the output signal of the signal level detector.

9. The interface unit of claim 6 further comprising:
a variable gain circuit for modifying an amplitude of a signal transmitted on a headset transmit path;
the plurality of signal lines from the handset port further including a handset port transmit path; and
a control logic further for alternately coupling the headset transmit path and a handset transmit path to the handset port transmit path; for setting the detector switch matrix to a detector switch configuration which couples the handset port transmit path to the signal level detector input; for receiving second and third output signals from the signal level detector, the second output signal generated in response to an audio test signal transmitted by the handset transmit path, the third output signal generated in response to the audio test signal transmitted by the headset transmit path; and for adjusting a gain of the variable gain circuit in response to the second and third output signals until a gain of the headset transmit path is substantially equal to a gain of the handset transmit path.

10. The interface unit of claim 1 wherein:

the interface unit further comprises a variable gain circuit for modifying an amplitude of a signal transmitted on a headset transmit path; and, the control logic further automatically adjusts a gain of the variable gain circuit until a gain of the headset transmit path is substantially equal to a gain of a handset transmit path.

11. A self-configuring telephone interface unit, comprising:

a switch matrix, settable to any of a plurality of switch configurations, each switch configuration coupling a plurality of signal lines from a handset port of a telephone to a plurality of signal lines from a headset, the plurality of a signal lines from the handset port including a handset port receive path, the plurality of a signal lines from the headset including a headset receive path; a variable gain circuit for modifying an amplitude of a signal transmitted on a headset transmit path switchably coupled to a handset port transmit path; a handset transmit path switchably coupled to the handset port transmit path; and a control logic, coupled to the switch matrix, that automatically sets the switch matrix to a preferred switch configuration from among the plurality of switch configurations, the preferred switch configuration coupling the handset port receive path to the headset receive path; and the control logic couples the handset port transmit path alternately to the headset transmit path and to the handset transmit path; receives a first gain signal and a second gain signal from the handset port transmit path; and adjusts the gain of the variable gain circuit in response to the first and second gain signals, the first gain signal generated by an audio test signal transmitted by the handset transmit path, the second gain signal generated by the audio test signal transmitted by the headset transmit path.

12. The interface unit of claim 11 further comprising:

a handset switch for switchably coupling the handset transmit path to the handset port transmit path;

the plurality of signal lines from the handset port further including the handset port transmit path; and the control logic further for switchably coupling the handset transmit path to the handset port transmit path by setting the handset switch.

13. The interface unit of claim 12 wherein the handset switch comprises a FET switch; and, the control logic comprises a FET gate driver for gating the FET switch.

14. The interface unit of claim 11 wherein:

the plurality of signal lines from the handset port further includes the handset port transmit path;

the plurality of signal lines from the headset further includes the headset transmit path; and the control logic further switchably couples the headset transmit path to the handset port transmit path by setting the switch matrix.

15. The interface unit of claim 11 further comprising:

a signal generator for generating a signal on the headset receive path, the signal indicating that the audio test signal may be transmitted.

16. A self-configuring headset and telephone interface unit, comprising:

a headset; a switch matrix, settable to any of a plurality of switch configurations, each switch configuration coupling a plurality of signal lines from a handset port of a telephone to a plurality of signal lines from a headset, the plurality of signal lines from the handset port including a handset port receive path, the plurality of signal lines from the headset including a headset receive path; and, a control logic, coupled to the switch matrix, that automatically determines which of the plurality of signal lines from the handset port comprise the handset port receive path, determines a preferred switch configuration from among the plurality of switch configurations based on which of the plurality of signal lines from the handset port comprise the handset port receive path, and sets the switch matrix to the preferred switch configuration, the preferred switch configuration coupling the handset port receive path to the headset receive path.

17. In a telephone interface unit comprising a switch matrix settable to any of a plurality of switch configurations, a method for automatically configuring the telephone interface unit comprising:

receiving a test signal on a handset port receive path; setting the switch matrix to each of at least two switch configurations; for each of the at least two switch configurations, measuring a signal on the headset receive path resulting from the test signal; and automatically setting the switch matrix to a preferred switch configuration from among the at least two switch configurations, the preferred switch configuration corresponding to the signal on the headset receive path with either a minimum or a maximum value.

18. The method of claim 17 wherein:

measuring the signal on the headset receive path comprises measuring a signal level of the signal; and the preferred switch configuration corresponds to the signal on the headset receive path with a maximum signal level.

19. The method of claim 17 further comprising:

receiving a first audio test signal on a handset transmit path; receiving a second audio test signal on a headset transmit path; alternately receiving a first gain signal and a second gain signal in succession, the first gain signal generated in response to the first audio test signal and indicating a first gain of the handset transmit path, the second gain signal generated in response to the second audio test signal and indicating a second gain of the headset transmit path; and, adjusting a third gain in the headset transmit path in response to the first and second gain signals until the first gain is substantially equal to the second gain.

20. The method of claim 19 further comprising:

generating an audio signal to signal a human to enable the audio sources.

21. The method of claim 19 wherein adjusting the third gain comprises:

adjusting the third gain until an amplitude of the first gain signal is substantially equal to an amplitude of the second gain signal.

22. The method of claim 21 wherein adjusting the third gain comprises:

setting the third gain to a minimum amplitude for the third gain; and, incrementally increasing the third gain until an amplitude of the first gain signal is substantially equal to an amplitude of the second gain signal.

23. In a telephone interface unit comprising a switch matrix settable to any of a plurality of switch configurations for interfacing a handset port of a telephone to a headset, the handset port coupled to the interface unit by a handset port receive path and a handset port transmit path, the headset coupled to the interface unit by a headset receive path and a headset transmit path, a method for automatically configuring the interface unit comprising:

receiving a test signal on a handset port receive path; setting the switch matrix to each of at least two switch configurations; for each of the at least two switch configurations, measuring a signal on the headset receive path resulting from the test signal; automatically setting the switch matrix to a preferred switch configuration from among the at least two switch configurations, the preferred switch configuration corresponding to the signal on the headset receive path with either a minimum or a maximum value; and automatically adjusting a gain of the headset transmit path to match a gain of the handset port transmit path.

* * * * *